United States Patent
Uji (10) Patent No.: US 9,539,539 B2
(45) Date of Patent: Jan. 10, 2017

(54) DEVICE FOR RECOVERING VOLATILE ORGANIC COMPOUND

(71) Applicant: Shigekazu Uji, Ichikawa (JP)

(72) Inventor: Shigekazu Uji, Ichikawa (JP)

( * ) Notice: Subject to any disclaimer, the term of this patent is extended or adjusted under 35 U.S.C. 154(b) by 24 days.

(21) Appl. No.: 14/646,720

(22) PCT Filed: Nov. 21, 2013

(86) PCT No.: PCT/JP2013/081402
§ 371 (c)(1),
(2) Date: May 21, 2015

(87) PCT Pub. No.: WO2014/080984
PCT Pub. Date: May 30, 2014

(65) Prior Publication Data
US 2015/0314228 A1 Nov. 5, 2015

(30) Foreign Application Priority Data
Nov. 22, 2012 (JP) .................... 2012-270760

(51) Int. Cl.
*B01D 53/02* (2006.01)
*B01D 53/72* (2006.01)
(Continued)

(52) U.S. Cl.
CPC ............... *B01D 53/72* (2013.01); *B01D 53/04* (2013.01); *B01D 53/70* (2013.01); *B01D 53/002* (2013.01);
(Continued)

(58) Field of Classification Search
CPC .................. B01D 2253/102; B01D 2253/106; B01D 2253/108; B01D 2253/11; B01D 2253/202; B01D 2257/2064; B01D 2257/7027; B01D 2257/704; B01D 2257/708; B01D 2258/02; B01D 2258/0216; B01D 2258/0258; B01D 2259/40086; B01D 53/002; B01D 53/04; B01D 53/70; B01D 53/72
See application file for complete search history.

(56) References Cited

U.S. PATENT DOCUMENTS 5,417,053 A   5/1995   Uji
6,141,955 A  11/2000   Akiyama et al.
(Continued)

FOREIGN PATENT DOCUMENTS

JP   50-59275 A    5/1975
JP   3-254810 A   11/1991
(Continued)

OTHER PUBLICATIONS

International Search Report for PCT/JP2013/081402, issued Jan. 14, 2014, 4 pages.
(Continued)

*Primary Examiner* — Christopher P Jones
(74) *Attorney, Agent, or Firm* — Squire Patton Boggs (US) LLP (57) ABSTRACT

(Problem to be Solved)
To provide a volatile organic compound recovery device which renders energy saving possible and renders the equipment simple.
(Means for Solution)
An untreated gas which contains a volatile organic compound is supplied to an adsorption tower (1), whereby the volatile organic compound is adsorbed onto the adsorbent. After completion of the adsorption, a volatile organic compound which has higher adsorbability than that of the volatile organic compound adsorbed onto the adsorbent is supplied to the adsorption tower (1) through a desorption gas supply valve (4). The volatile organic compound which has low-adsorbability and has been adsorbed onto the adsorbent
(Continued)

is then desorbed therefrom due to competitive adsorption with the high-adsorbability volatile organic compound fed later, and the high-adsorbability volatile organic compound itself is adsorbed onto the adsorbent instead. As a result, the volatile organic compound which has been adsorbed is discharged from the adsorption tower (1) and recovered.

20 Claims, 6 Drawing Sheets

(51) Int. Cl.
*B01D 53/04* (2006.01)
*B01D 53/70* (2006.01)
*B01D 53/00* (2006.01)

(52) U.S. Cl.
CPC ... *B01D 2253/102* (2013.01); *B01D 2253/106* (2013.01); *B01D 2253/108* (2013.01); *B01D 2253/11* (2013.01); *B01D 2253/202* (2013.01); *B01D 2257/2064* (2013.01); *B01D 2257/704* (2013.01); *B01D 2257/708* (2013.01); *B01D 2257/7027* (2013.01); *B01D 2258/02* (2013.01); *B01D 2258/0216* (2013.01); *B01D 2258/0258* (2013.01); *B01D 2259/40086* (2013.01)

(56) References Cited

U.S. PATENT DOCUMENTS

| | | | |
|---|---|---|---|
| 6,233,940 | B1 | 5/2001 | Uji |
| 7,678,179 | B2 | 3/2010 | Uji |
| 7,854,790 | B2 | 12/2010 | Uji et al. |
| 7,914,608 | B2 | 3/2011 | Uji |
| 8,142,555 | B2 | 3/2012 | Uji |
| 2007/0175327 | A1 | 8/2007 | Uji |
| 2007/0193447 | A1 | 8/2007 | Uji |
| 2008/0006152 | A1 | 1/2008 | Uji et al. |
| 2008/0041032 | A1 | 2/2008 | Uji |
| 2012/0297774 | A1 | 11/2012 | Uji |

FOREIGN PATENT DOCUMENTS

| | | |
|---|---|---|
| JP | 2007-160163 | 6/2007 |
| JP | 2007-244985 A | 9/2007 |
| JP | 3976986 B | 9/2007 |
| JP | 2012-115773 A | 6/2012 |
| JP | 2012-166155 A | 6/2012 |

OTHER PUBLICATIONS

International Preliminary Report on Patentability and Written Opinion of the International Searching Authority and its translation for PCT/JP2013/081402, issued May 26, 2015, 8 pages.

DEVICE FOR RECOVERING VOLATILE ORGANIC COMPOUND

CROSS-REFERENCE TO RELATED APPLICATIONS

This application is a 35 U.S.C. §371 national stage entry of International Patent Application PCT/JP2013/081402, filed on Nov. 21, 2013 (published as WO 2014/080984 A1 on May 30, 3014), which claims priority to Japanese patent application No. 2012-270760, filed on Nov. 22, 2012.

TECHNICAL FIELD

The present invention relates to a recovery method and a recovery device for recovering a volatile organic compound using adsorption when water-soluble compounds such as ethyl acetate, methyl ethyl ketone, isopropyl alcohol, and the like are contained in the volatile organic compound or the technical field of a method and a recovery device for separating and recovering the volatile organic compounds separately for each type of compound when the volatile organic compounds consist of a plurality of types of compounds.

BACKGROUND ART

It has conventionally been practiced to separate and recover volatile organic compounds from exhaust gas containing the volatile organic compounds such as toluene, xylene, methylene chloride, and the like from the standpoint of air pollution prevention and effective utilization of resources.

For example, the activated carbon adsorption method has been utilized to recover the volatile organic compound such as an organic solvent or the like contained in exhaust gas generated by the manufacturing process of plastic products, synthetic fibers, and semiconductors or various operations in magnetic tape industry. In the activated carbon adsorption method, two types of devices are known in the art. One is a fixed bed solvent recovery device which is provided with a plurality of adsorption towers packed with activated carbon so as to alternately repeat the adsorption and desorption. The other is a fluidized bed solvent recovery device which drops activated carbon from the top of a tower, performs adsorption of solvent or the like while flowing the activated carbon by the raw gas fed from the bottom of the tower, and then causes a separately provided desorber to desorb the adsorbed activated carbon obtained at the tower bottom. The adsorption steps by these devices are carried out under atmospheric pressure, and the desorption steps are often carried out at atmospheric pressure or under reduced pressure using water vapor or nitrogen gas.

Figure 7:
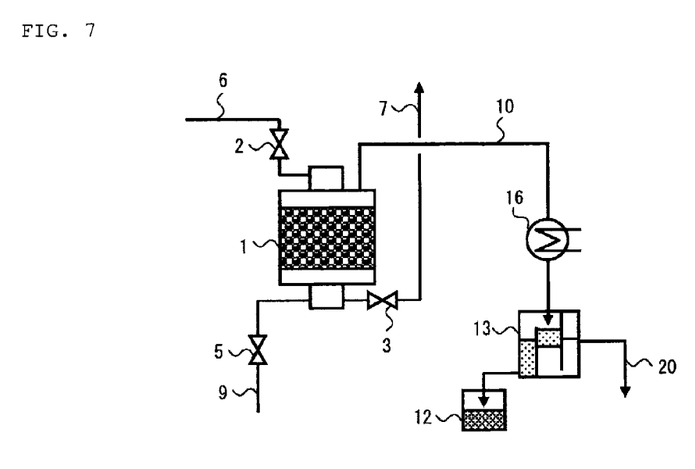
FIG. 7 is an explanatory view illustrating a fixed bed adsorption device using a conventional adsorbent.

Among these adsorption methods, the particular operation is described by taking a fixed bed adsorption device for performing atmospheric pressure desorption as an example with reference to FIG. 7. When an untreated gas containing a volatile organic compound is fed into an adsorption tower (1), the volatile organic compound in the untreated gas is adsorbed by the activated carbon layer and then the purified exhaust gas is released into the atmosphere. Upon completion of adsorption in the adsorption tower (1), an untreated gas intake valve (2) and a treated gas exhaust valve (3) are closed, water vapor is blown into the adsorption tower (1) through an adsorbent regeneration gas supply valve (5), and then the adsorbed volatile organic compounds are desorbed and discharged in gaseous form together with the water vapor. The gas mixture (desorbed gas) is introduced into a condenser (16) and is condensed by cooling.

If insoluble in each other, water in the condensate and the recovered volatile organic compound are separated into the volatile organic compound phase and the aqueous phase due to a difference in specific gravity at a separation tank (13). Then, the water is discharged as a wastewater (20) and the volatile organic compound is recovered in a volatile organic compound recovery tank (12). Note that separation into the upper phase and the lower phase in the separation tank (13) is determined by the difference in specific gravity between water and the volatile organic compound, and thus, the relationship of upper and lower phase is not fixed.

However, if water and the recovered volatile organic compound are partially or fully soluble in each other, it is necessary to conduct distilled separation using a distillation device in order to separate them and recover the solvent alone. If an untreated gas contains a plurality of types of volatile organic compounds or if, the recovered volatile organic compounds are partially or fully soluble in each other, it is also necessary to conduct distilled separation using a distillation device in order to separate them for individual recovery. Typical examples of the volatile organic compound which is soluble in water include ethyl acetate, methyl ethyl ketone, isopropyl alcohol, and the like. These volatile organic compounds have been widely used in printing industry, painting industry, and the like. Although most of them have conventionally been burned at the time of disposal for preventing air pollution, it is expected in the future that these volatile organic compounds are effectively used by recycling (material recycling) as solvents or by recycling (energy recycling) as fuels alternative to fossil fuel.

PRIOR ART DOCUMENTS

Patent Document 1: Japanese Patent No. 3976986
Patent Document 2: Japanese Patent Laid-Open No. 2007-160163

DISCLOSURE OF THE INVENTION

Problems to be Solved by the Invention

The water-soluble volatile organic compound as described above has solubility in water in the range of from 10% to 100%, and a significant amount thereof is dissolved in water. Thus, in order to provide the volatile organic compound to energy recycling, it is necessary to remove water from the recovery solution, and thus, a distillation operation is essential after adsorption recovery. Further, in order to provide the volatile organic compound to material recycling, it is necessary to separate and recover the volatile organic compounds separately for each type of compound if the recovery solvent is a solvent mixture consisting of a plurality of types of volatile organic compounds, and thus, a distillation operation is also essential after adsorption recovery in this case. However, the problem lies in the fact that a relatively large energy consumption is required in the distillation operation, resulting in an inefficient process in terms of energy. Solving this problem has been a concern of the prior art.

The present invention has been devised in consideration of the above circumstances. It is an object of the present invention to provide a volatile organic compound recovery device for desorbing the volatile organic compound from the adsorbent having adsorbed thereon the volatile organic compound, wherein the volatile organic compound recovery device can recover the adsorbed water-soluble volatile organic compound without being dissolved in water and wherein, when the adsorbed volatile organic compound consists of a plurality of types of compounds, the volatile organic compound recovery device can separate and recover the volatile organic compounds separately for each type of compound, so that the volatile organic compound recovery device does not require the distillation operation, and renders energy saving possible and the equipment simple.

Means for Solving the Problems

The present inventors have focused on the finding that the volatile organic compound adsorbed onto the adsorbent can be desorbed by using another volatile organic compound without use of water vapor in order to desorb the volatile organic compound adsorbed onto the adsorbent.

In a volatile organic compound recovery device for desorbing a volatile organic compound from an adsorbent having adsorbed thereon the volatile organic compound, when a volatile organic compound having higher adsorbability than that of the volatile organic compound adsorbed onto the adsorbent is flown into the adsorbent, a phenomenon occurs in which the volatile organic compound having high-adsorbability expels the volatile organic compound having low-adsorbability which has already been adsorbed onto the adsorbent from the adsorbent and then the volatile organic compound having high-adsorbability is adsorbed itself onto the adsorbent instead of the volatile organic compound having low-adsorbability. This phenomenon is referred to as "competitive adsorption".

As a result of competitive adsorption, no water vapor is contained in the low-adsorbability volatile organic compound expelled from the adsorbent by the high-adsorbability volatile organic compound. Thus, the conclusion is reached that no water is mixed into the low-adsorbability volatile organic compound even if it is condensed and liquefied, resulting in accomplishing the present invention.

Thus, the present invention provides a volatile organic compound recovery device and a recovery method using a volatile organic compound having higher adsorbability than that of the volatile organic compound adsorbed onto the adsorbent or a volatile organic compound having the highest adsorbability among a plurality of types of volatile organic compounds adsorbed onto the adsorbent upon desorption of the volatile organic compound from the adsorbent.

More specifically, the present invention provides a device for recovering a volatile organic compound contained in an untreated gas, the device comprising: an adsorption tower containing an adsorbent for adsorbing the volatile organic compound contained in the untreated gas; a desorption gas supply means configured to supply a volatile organic compound which has higher adsorbability than that of the volatile organic compound adsorbed onto the adsorbent or a volatile organic compound which has the highest adsorbability among a plurality of types of volatile organic compounds adsorbed onto the adsorbent to the adsorption tower; and a recovery means configured to recover the volatile organic compound desorbed from the adsorbent due to competitive adsorption with the volatile organic compound having high-adsorbability.

The present invention also provides a method for recovering a volatile organic compound contained in an untreated gas, the method comprises: the steps of (i) adsorbing the volatile organic compound contained in the untreated gas onto an adsorbent; (ii) supplying a volatile organic compound which has higher adsorbability than that of the volatile organic compound adsorbed onto the adsorbent or a volatile organic compound which has the highest adsorbability among a plurality of types of volatile organic compounds adsorbed onto the adsorbent to the adsorbent and then desorbing the volatile organic compound adsorbed onto the adsorbent in step (i) due to competitive adsorption; and (iii) recovering the desorbed volatile organic compound.

The present invention provides a volatile organic compound recovery device for recovering a volatile organic compound from an untreated gas by adsorbing a single or a plurality of types of volatile organic compounds contained in the untreated gas onto the adsorbent and then desorbing the volatile organic compound adsorbed onto the adsorbent, wherein the volatile organic compound recovery device is characterized in that the volatile organic compound recovery device includes an adsorption tower in which the adsorbent is stored and an untreated gas containing the volatile organic compound is fed through a gas cutoff valve; a desorption gas supply means configured to supply a volatile organic compound having higher adsorbability than that of the volatile organic compound adsorbed onto the adsorbent or a volatile organic compound having the highest adsorbability among a plurality of types of volatile organic compounds adsorbed onto the adsorbent to the adsorption tower; and an in-adsorption tower gas discharge means configured to discharge residual gas remaining in the adsorption tower after completion of adsorption and the volatile organic compound desorbed from the adsorbent by supplying the volatile organic compound having higher adsorbability than that of the volatile organic compound adsorbed onto the adsorbent sequentially outside of the adsorption tower.

Furthermore, the volatile organic compound recovery device of the present invention includes a means configured to mix the volatile organic compound with air or nitrogen gas or other inert gas and to supply the gas mixture into the adsorption tower when a volatile organic compound having higher adsorbability than that of the volatile organic compound adsorbed onto the adsorbent is supplied into the adsorption tower for desorption of the adsorbed volatile organic compound.

The volatile organic compound recovery device of the present invention also includes a supply mean configured to supply an adsorbent regeneration gas for desorbing a volatile organic compound, which has higher adsorbability than that of the volatile organic compound adsorbed onto the adsorbent as a result of desorbing the adsorbed volatile organic compound, into the adsorption tower; and a desorbed gas discharge means configured to discharge a gas mixture of the adsorbent regeneration gas and the desorbed volatile organic compound outside of the adsorption tower so as to reproduce the adsorbent into the adsorbable state again.

Effects of the Invention

With the aid of the above configuration, the volatile organic compound recovery device and the recovery method of the present invention can recover the volatile organic compound recovered from the untreated gas without being dissolved in water even if the untreated gas contains a water-soluble volatile organic compound. As a result, it is possible to eliminate a need for a distillation device to separate and remove water. Even when the adsorbed volatile organic compounds consist of a plurality of types of compounds, the volatile organic compounds can be separated and recovered separately for each type of compound. Thus, it is also possible to eliminate a need for a distillation device to separate and recover a plurality of types of volatile organic compounds liquefied and recovered separately for each type of compound. As a result, energy consumption by the distillation device may be eliminated, so that this brings out a beneficial effect that the volatile organic compound recovery device and the recovery method can render energy saving possible and also render the equipment simple.

MOST PREFERABLE EMBODIMENTS FOR CARRYING OUT THE INVENTION

The present invention relates to a recovery method and a recovery device for recovering a volatile organic compound from an untreated gas by adsorbing a single or a plurality of types of volatile organic compounds contained in the untreated gas onto the adsorbent and then by desorbing the volatile organic compound adsorbed onto the adsorbent with use of a desorption gas. Upon desorption of the volatile organic compound from the adsorbent, the adsorbed water-soluble volatile organic compound can be recovered without being dissolved in water using the high-adsorbability volatile organic compound onto the adsorbent instead of water vapor as a desorption gas.

The volatile organic compound recovery device of the present invention includes an adsorption tower, a desorption gas supply means, and a volatile organic compound recovery means. The adsorption tower contains an adsorbent for adsorbing the volatile organic compound contained in the untreated gas. In the present invention, examples of the untreated gas include exhaust gas generated by the manufacturing process of plastic products, synthetic fibers, and semiconductors or various operations in magnetic tape industry; exhaust gas discharged into the atmosphere from small common volatile organic compound emission sources such as gas stations, fuel oil shipping facilities, oil depots, cleaning business, printing industry, coating industry, and the like; and the like. In the present invention, examples of the volatile organic compound contained in the untreated gas include esters such as methyl acetate, ethyl acetate, propyl acetate and butyl acetate; ketones such as acetone and methyl ethyl ketone; aldehydes such as acetaldehyde; alcohols such as methanol, ethanol, propyl alcohol (n-propyl alcohol and isopropyl alcohol) and butanol (n-butanol, isobutanol, sec-butanol and tert-butanol); halogenated hydrocarbons such as dichloromethane and chloroform; aromatic compounds such as xylene, toluene and benzene; and a mixture of two or more thereof.

In the present invention, examples of the adsorbent include activated carbon, silica gel, alumina, clay and zeolite. Optionally, a polymeric material, for example, a cross-linked polymeric material may be used as the adsorbent. The adsorbent is preferably activated carbon. The shape of the activated carbon may be spherical or powder but is not particularly limited. As the activated carbon, one having a specific surface area of from 800 to 1200 $m^2 \cdot g^{-1}$, a pore volume of from 0.2 to 2 $cm^3 \cdot g^{-1}$, and a pore size of from 1 to 4 nm may be used, but is not limited thereto.

The desorption gas supply means provided in the device of the present invention is used to supply gas (desorption gas) for desorbing the volatile organic compound adsorbed onto the adsorbent from the adsorbent into the adsorption tower. The desorption gas desorbs the volatile organic compound adsorbed onto the adsorbent due to competitive adsorption and the desorption gas itself is adsorbed onto the adsorbent. In the present invention, the desorption gas contains a volatile organic compound having higher adsorbability than that of the volatile organic compound adsorbed onto the adsorbent or a volatile organic compound having the highest adsorbability among a plurality of types of volatile organic compounds adsorbed onto the adsorbent (each of these is also referred to herein as "high-adsorbability volatile organic compound"). The desorption gas may be a gas mixture of a high-adsorbability volatile organic compound and air or an inert gas (e.g., nitrogen or argon) or a gas mixture of a mixture thereof. The volatile organic compound recovery device of the present invention may include a desorption gas mixing means for producing the gas mixture.

Examples of the high-adsorbability volatile organic compound include aromatic compounds such as toluene, xylene, or benzene. The high-adsorbability volatile organic compound is preferably toluene. Those skilled in the art can select a suitable high-adsorbability volatile organic compound based on the volatile organic compound contained in the untreated gas.

The volatile organic compound recovery means provided in the device of the present invention recovers the volatile organic compound desorbed from the adsorbent due to competitive adsorption with the high-adsorbability volatile organic compound. The recovery means may include a condenser, a volatile organic compound recovery tank, and/or a vacuum pump. If the untreated gas contains a plurality of types of the volatile organic compounds, a plurality (e.g., 2, 3, 4, 5 or more) of the recovery means may be present. In this case, the volatile organic compounds contained in the untreated gas can be recovered separately for each type of compound using a difference in adsorbability.

The volatile organic compound recovery device of the present invention may include an in-adsorption tower gas discharge means. The in-adsorption tower gas discharge means is used to discharge residual gas remaining in the adsorption tower after completion of adsorption and the volatile organic compound desorbed from the adsorbent outside of the adsorption tower. The in-adsorption tower gas discharge means may include a vacuum pump.

The volatile organic compound recovery device of the present invention may further include an adsorbent regeneration gas supply means. The adsorbent regeneration gas supply means supplies a gas (adsorbent regeneration gas) for desorbing the high-adsorbability volatile organic compound from the adsorbent into the adsorption tower, so that the adsorbent can be regenerated into the adsorbable state again for reuse. In the present invention, examples of the adsorbent regeneration gas include water vapor, an inert gas (such as nitrogen or argon), or a mixture thereof.

The volatile organic compound recovery device of the present invention may further include a recovery means configured to recover the high-adsorbability volatile organic compound. The recovery means may include a condenser, a separation tank, a volatile organic compound recovery tank, and/or a vacuum pump. When a water-insoluble compound such as toluene is used as the high-adsorbability volatile organic compound and water vapor is used as the adsorbent regeneration gas, these can be readily separated in the separation tank due to a difference in specific gravity. The recovered high-adsorbability volatile organic compound may further be reused for competitive adsorption as the desorption gas.

The volatile organic compound recovery method of the present invention may be carried out with use of the volatile organic compound recovery device. The volatile organic compound recovery method of the present invention may include the following steps:
(i) adsorbing the volatile organic compound contained in the untreated gas onto an adsorbent;
(ii) supplying a volatile organic compound having higher adsorbability than that of the volatile organic compound adsorbed onto the adsorbent or a volatile organic compound having the highest adsorbability among a plurality of types of volatile organic compounds adsorbed onto the adsorbent to the adsorbent and then desorbing the volatile organic compound adsorbed onto the adsorbent in step (i) due to competitive adsorption; and
(iii) recovering the desorbed volatile organic compound.

In step (ii), the high-adsorbability volatile organic compound may be mixed with air or an inert gas (such as nitrogen or argon) or a mixture thereof so as to supply the gas mixture to the adsorbent. The recovery process in step (iii) may include a step of condensing the desorbed volatile organic compound. A condenser, a volatile organic compound recovery tank, and/or a vacuum pump may be used in the recovery process in step (iii). Furthermore, if the untreated gas contains a plurality of types of the volatile organic compounds, the desorbed volatile organic compounds can be recovered separately for each type of compound in step (iii). This can be carried out by utilizing a difference in adsorbability of the volatile organic compounds onto the adsorbent. More specifically, see Example 3.

The volatile organic compound recovery method of the present invention may further include a step of (iv) supplying a gas for desorbing the high-adsorbability volatile organic compound to the adsorbent. The adsorbent can be regenerated for reuse by step (iv). The volatile organic compound recovery method of the present invention may further include a step of (v) recovering the high-adsorbability volatile organic compound desorbed from the adsorbent in step (iv). The high-adsorbability volatile organic compound can be recovered for reuse by step (v). A condenser, a separation tank, a volatile organic compound recovery tank, and/or a vacuum pump may be used in the recovery process of step (v). Steps (i) to (iii) may be repeated after step (iv) or (v).

Next, the present invention will further be described below with reference to the drawings in the examples of the present invention.

EXAMPLES

Example 1

Figure 1:
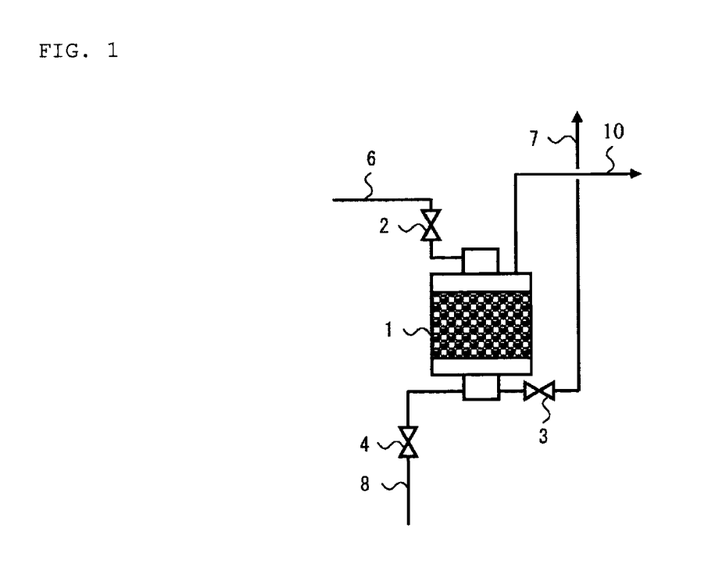
FIG. 1 is a system structural view illustrating a characteristic configuration of a volatile organic compound recovery device according to Example 1 of the present invention.

FIG. 1 is a system structural view illustrating a characteristic configuration of a volatile organic compound recovery device according to Example 1 of the present invention. In FIG. 1, reference numeral 1 represents an adsorption tower, reference numeral 2 represents an untreated gas intake valve, reference numeral 3 represents a treated gas exhaust valve, and reference numeral 4 represents a desorption gas supply valve.

The adsorption tower (1) is configured to recover the volatile organic compound from an untreated gas in which an untreated gas containing the volatile organic compound is adsorbed onto an adsorbent (e.g., activated carbon) and the volatile organic compound adsorbed onto the activated carbon is desorbed by a volatile organic compound having higher adsorbability than that of the volatile organic compound adsorbed onto the adsorbent. Since the high-adsorbability volatile organic compound has been adsorbed onto the activated carbon after recovery of the volatile organic compound from the untreated gas, the high-adsorbability volatile organic compound is desorbed from the activated carbon by vapor or nitrogen, so that the adsorbent can be regenerated into the adsorbable state again.

More specifically, the volatile organic compound recovery device includes the adsorption tower (1) containing the adsorbent; an untreated gas supply line (6) for supplying an untreated gas containing a volatile organic compound to the adsorption tower (1) through an untreated gas intake valve (2); a treated gas exhaust line (7) for exhausting the treated gas from the adsorption tower (1) through a treated gas exhaust valve (3); and a desorption gas supply line (8) for supplying a desorption gas (a volatile organic compound having higher adsorbability than that of the volatile organic compound adsorbed onto the adsorbent, air, nitrogen gas, other inert gas or water vapor) to the adsorption tower (1) through a desorption gas supply valve (4) upon desorption of the adsorbed volatile organic compound.

A description will be given of a method for recovering a volatile organic compound by the recovery system configured as described above.

An untreated gas containing a volatile organic compound is supplied to the adsorption tower (1), whereby the volatile organic compound is adsorbed onto the adsorbent. After completion of adsorption upon saturation of the adsorbent with the volatile organic compound, a volatile organic compound having higher adsorbability than that of the volatile organic compound adsorbed onto the adsorbent is supplied to the adsorption tower (1) through the desorption gas supply valve (4). Then, the volatile organic compound adsorbed onto the adsorbent is desorbed therefrom due to competitive adsorption with the high-adsorbability volatile organic compound fed later, and the high-adsorbability volatile organic compound itself is adsorbed onto the adsorbent instead. As a result, the desorbed volatile organic compound is discharged from the adsorption tower (1) for recovery.

According to the present embodiment, the volatile organic compound discharged from the adsorption tower (1) contains no water vapor, and thus, the volatile organic compound is not dissolved in water when it is cooled, condensed, and liquefied for recovery, even if the compound is soluble in water. In addition, even if a plurality of volatile organic compounds is adsorbed, the adsorbed volatile organic compounds are discharged in ascending order of adsorbability due to the mutually competitive adsorption upon discharging them from the adsorption tower (1), so that the volatile organic compounds can be separated and recovered separately for each type of compound.

As described above, the volatile organic compound recovery device according to the present embodiment does not require the distillation device in order to recover the water-soluble volatile organic compound and to separate and recover a plurality of types of volatile organic compounds separately for each type of compound, so that the volatile organic compound recovery device can render energy saving possible and render the equipment simple.

Example 2

Figure 2:
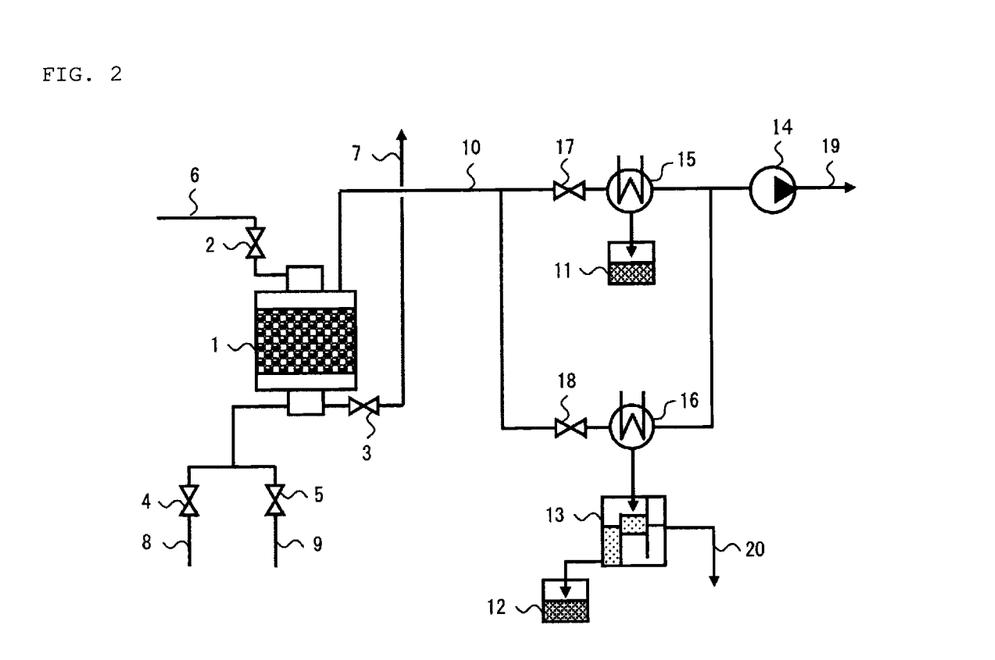
FIG. 2 is a system structural view illustrating a characteristic configuration of a volatile organic compound recovery device according to Example 2 of the present invention.

Next, a description will be given of Example 2 of the present invention with reference to the system structural view shown in FIG. 2.

Upon completion of adsorption in the volatile organic compound recovery device according to Example 1, the untreated gas remained in the adsorption tower (1) may contain water in most cases. If the adsorbed volatile organic compound is soluble in water, there arises a problem that it is difficult for the device to prevent water from being dissolved in the desorbed volatile organic compound when it is cooled, condensed, and recovered after being discharged from the adsorption tower (1).

Example 2 is intended to solve the problem of Example 1 and relates to a volatile organic compound recovery device more closer to a real machine. In FIG. 2, the same reference numerals are used to denote the same elements as those in Example 1 described above.

The adsorption tower (1) is configured to recover the volatile organic compound from the untreated gas in which an untreated gas containing the volatile organic compound is adsorbed onto the adsorbent (e.g., activated carbon) and the volatile organic compound adsorbed onto the activated carbon is desorbed by a volatile organic compound having higher adsorbability than that of the volatile organic compound adsorbed onto the adsorbent. Since the high-adsorbability volatile organic compound has been adsorbed onto the activated carbon after recovery of the volatile organic compound from the untreated gas, the high-adsorbability volatile organic compound is desorbed from the activated carbon by an adsorbent regeneration gas (e.g., water vapor or nitrogen gas), so that the adsorbent can be regenerated into the adsorbable state again.

More specifically, the volatile organic compound recovery device includes the adsorption tower (1) containing the adsorbent; an untreated gas supply line (6) for supplying an untreated gas containing a volatile organic compound to the adsorption tower (1) through the untreated gas intake valve (2); a treated gas exhaust line (7) for exhausting the treated gas from the adsorption tower (1) through the treated gas exhaust valve (3); a desorption gas supply line (8) for supplying a desorption gas (a volatile organic compound having higher adsorbability than that of the volatile organic compound adsorbed onto the adsorbent, air, nitrogen gas, or other inert gas) to the adsorption tower (1) through the desorption gas supply valve (4) upon desorption of the adsorbed volatile organic compound; an adsorbent regeneration gas supply line (9) for supplying an adsorbent regeneration gas (nitrogen gas, other inert gas or water vapor) to the adsorption tower (1) through the adsorbent regeneration gas supply valve (5) in order to desorb the high-adsorbability volatile organic compound adsorbed onto the adsorbent and to regenerate the adsorbent into the adsorbable state again; a desorption gas line (10) for supplying a desorbed gas discharged from the adsorption tower (1) to condensers (15) and (16) through desorbed gas switching valves (17) and (18); and a desorbed gas exhaust line (19). If the desorbed gas is the volatile organic compound having low-adsorbability desorbed by the high-adsorbability volatile organic compound, the desorbed volatile organic compound having low-adsorbability is sucked by a vacuum pump (14). After being discharged from the adsorption tower (1), the desorbed volatile organic compound is liquefied in the condenser (15) through the desorbed gas switching valve (17) to be recovered in a volatile organic compound recovery tank (11).

If the desorption gas for desorbing the volatile organic compound having low-adsorbability is the high-adsorbability volatile organic compound, the desorption gas is desorbed by an adsorbent regeneration gas (nitrogen gas, other inert gas or water vapor) and the desorbed high-adsorbability volatile organic compound is sucked by the vacuum pump (14). After being discharged from the adsorption tower (1), the desorbed high-adsorbability volatile organic compound is liquefied in the condenser (16) through a desorbed gas switching valve (18). Water is separated from the volatile organic compound in the separation tank (13) by gravity separation, and the isolated volatile organic compound is recovered in the volatile organic compound recovery tank (12).

Figure 3:
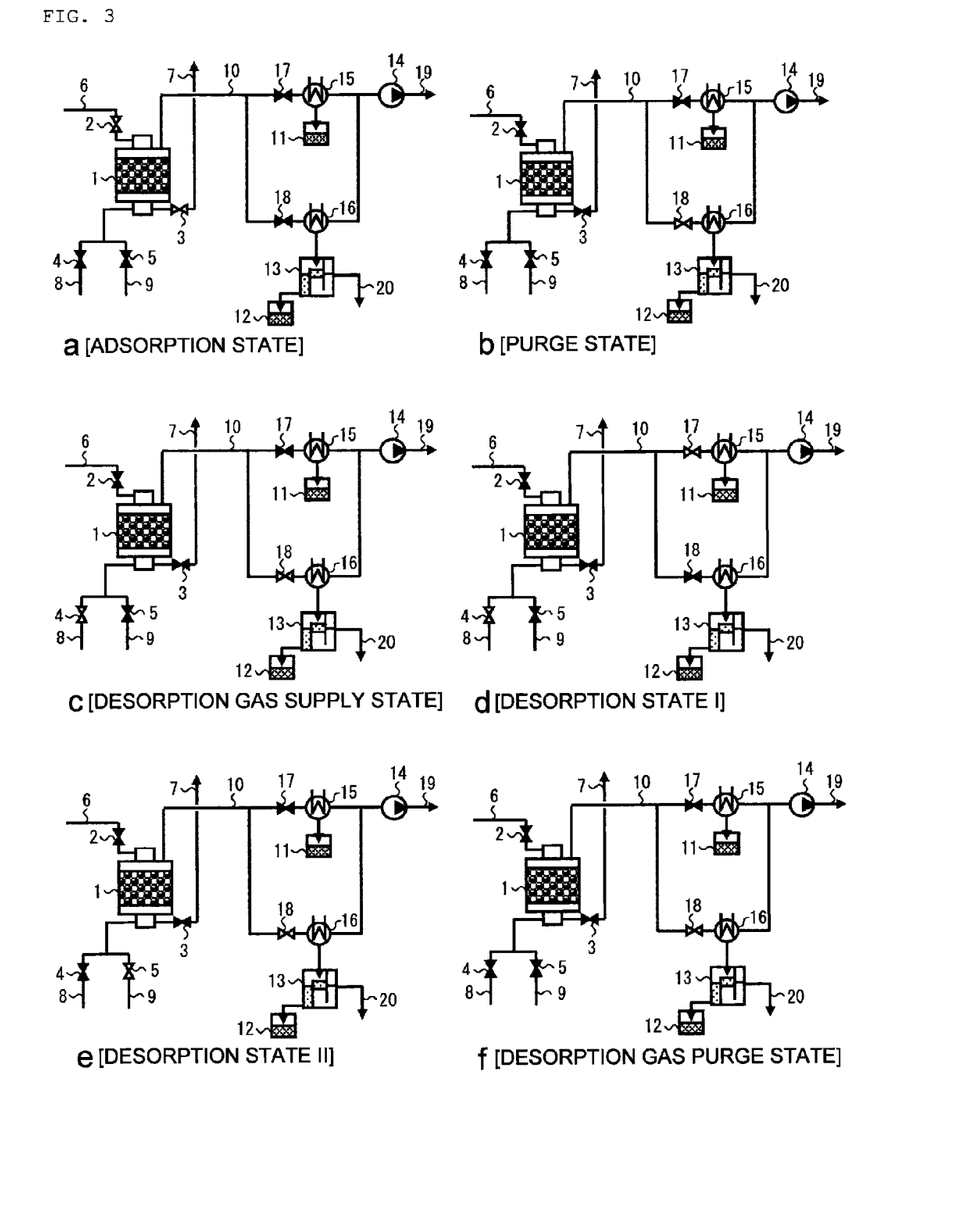
FIG. 3 is a schematic view illustrating the operating states (a) to (f) of the volatile organic compound recovery device according to Example 2 of the present invention, where symbol "a" represents the adsorption state, "b" represents the purge state, "c" represents the desorption gas supply state, "d" represents the desorption state I, "e" represents the desorption state II, and "f" represents the desorption gas purge state.
Figure 4:
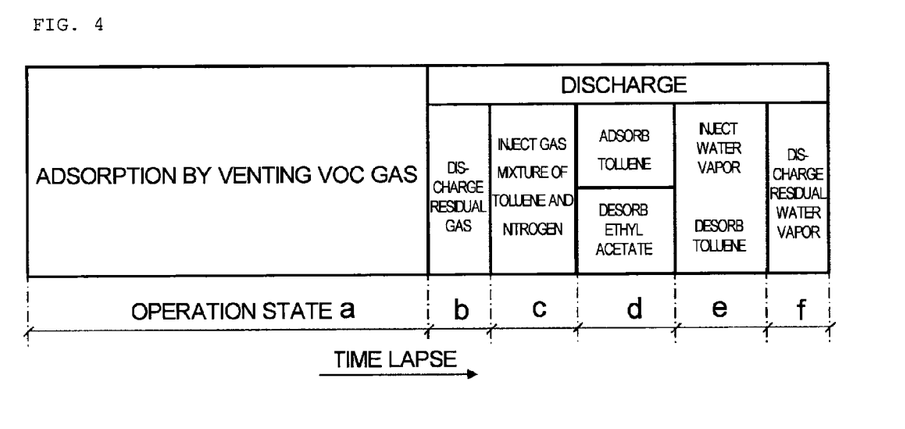
FIG. 4 is a timing chart illustrating the change in the operating state of the volatile organic compound recovery device according to Example 2 of the present invention.

Next, a detailed description will be given of the operations of the adsorption tower (1), the vacuum pump (14), the condensers (15) and (16), the desorption gas supply valve (4), the adsorbent regeneration gas supply valve (5), and the desorbed gas switching valves (17) and (18) with reference to FIGS. 3 to 4. FIGS. 3 and 4 show the open/closed states of the untreated gas intake valve (2), the treated gas exhaust valve (3), the desorption gas supply valve (4), the adsorbent regeneration gas supply valve (5), and the desorbed gas switching valves (17) and (18) described above. FIG. 4 is a timing chart illustrating a time-series change in the operating state in FIG. 3.

In the present embodiment, the high-adsorbability volatile organic compound serving as a desorption gas is toluene and the low-adsorbability volatile organic compound to be desorbed is ethyl acetate. In the particular application of the present invention, it is not limited to these materials but may be applied to the combination of many volatile organic compounds. In the present embodiment, the state of the adsorbent in the adsorption tower (1) changes in the order of the adsorption state (a)→the purge state (b)→the desorption gas supply state (c)→the desorption state I (d)→the desorption state II (e)→the desorption gas purge state (f) by the repetition of the operating states as shown in FIG. 3.

In the untreated gas intake valve (2), the treated gas exhaust valve (3), the desorption gas supply valve (4), the adsorbent regeneration gas supply valve (5), and the desorbed gas switching valves (17) and (18), white display indicates that each valve is in the "an open state" and black display indicates that each valve is in the "closed state".

The operating state (a) in FIG. 3 indicates the "adsorption state". Specifically, in the adsorption tower (1), the untreated gas intake valve (2) and the treated gas exhaust valve (3) are set in an open state and the desorption gas supply valve (4), the adsorbent regeneration gas supply valve (5), and the desorbed gas switching valves (17) and (18) are set in a closed state, so that the untreated gas is sequentially supplied to the adsorption tower (1). As a result, it is the "adsorption state" in which the volatile organic compound contained in the untreated gas is adsorbed onto the adsorbent stored in the adsorption tower (1) and the treated gas passed through the adsorbent is sequentially discharged therefrom.

When the adsorbent stored in the adsorption tower (1) is in the saturated state after adsorption of the volatile organic compound, the untreated gas intake valve (2) and the treated gas exhaust valve (3) are set in a closed state, and the desorbed gas switching valve (18) is set in an open state, then the vacuum pump (14) is activated, so that the operating state transitions to the "purge state" shown in the operating state (b) in FIG. 3 in which residual gas remaining in the adsorption tower (1) is discharged. In this "purge state", the untreated gas intake valve (2), the treated gas exhaust valve (3), the desorption gas supply valves (4) and (5), and the desorbed gas switching valve (17) are set in a closed state, so that the adsorption tower (1) is in the reduced pressure state. The reason why residual gas remaining in the adsorption tower (1) is discharged without passing through the condenser (15) in the "purge state" is because moisture may be contained in the residual gas remaining in the adsorption tower (1), and thus, it is to prevent moisture from being mixed into the volatile organic compound to be condensed in the condenser (15) later.

Figure 8:
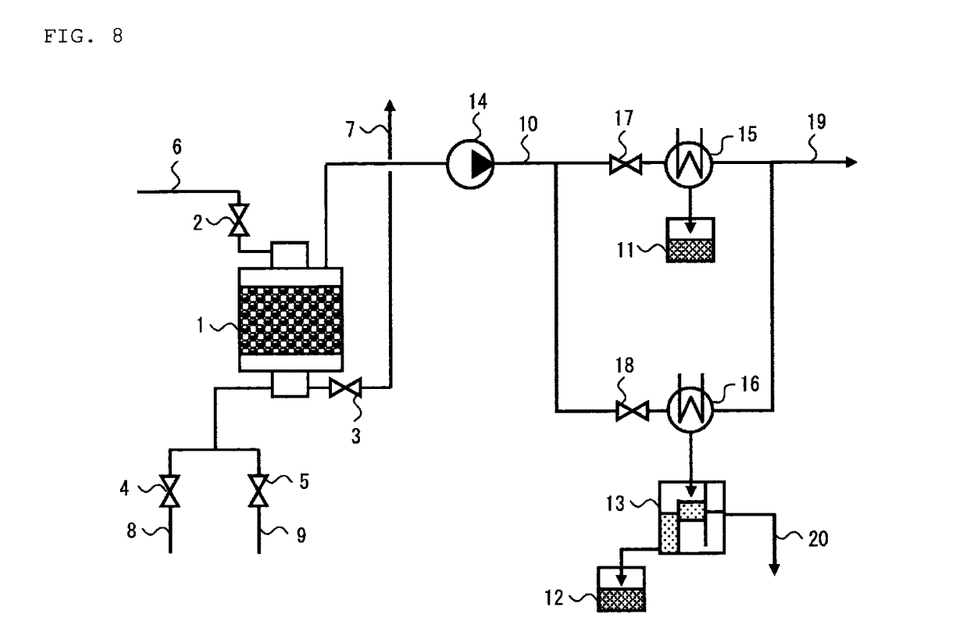
FIG. 8 is a system structural view illustrating a characteristic configuration of a volatile organic compound recovery device with another configuration according to Example 2 of the present invention.

In the present embodiment, the vacuum pump (14) is disposed downstream of the condenser (15). In the particular application of the present invention, it is not limited to such a configuration but it may be advantageous to condense the volatile organic compound discharged from the adsorption tower (1) in the condenser (15) at the atmospheric pressure depending on the type of the volatile organic compound. In such a case, the vacuum pump (14) may also be disposed upstream of the condenser (15) as shown in FIG. 8.

When the adsorption tower (1) becomes a predetermined reduced pressure state, the operating state transitions to the "desorption gas supply state" shown in the operating state (c) in FIG. 3. The desorption gas supply valve (4) is set in an open state, and a mixture of toluene serving as the desorption gas and air or nitrogen gas or other inert gas is supplied to the adsorption tower (1). The mixing ratio of the both gases is set such that the partial pressure of toluene as the desorption gas is equal to or less than the vapor pressure of toluene at the temperature of the gas mixture. This mixing ratio is set to prevent the supplied toluene from condensation. Thus, if the predetermined vacuum state is less than the saturation pressure at the temperature of toluene, air or nitrogen gas or other inert gas may not be mixed with toluene.

As the gas mixture of toluene and air or nitrogen gas or other inert gas is supplied to the adsorption tower (1), residual gas remaining in the adsorption tower (1) is continuously discharged. By further supplying a gas mixture of toluene and air or nitrogen gas or other inert gas to the adsorption tower (1), the state is realized in which it completes discharging the residual gas remained in the adsorption tower (1). This operating state is the completion of the "desorption gas supply state".

Upon completion of the "desorption gas supply state", the desorbed gas switching valve (17) is set in an open state, the desorbed gas switching valve (18) is set in a closed state, and the operating state transitions to the "desorption state I" shown in the operating state (d) in FIG. 3. Since toluene which has reached the adsorbent has higher adsorbability than that of the volatile organic compound (ethyl acetate in this case) adsorbed onto the adsorbent, ethyl acetate is expelled from the adsorbent and toluene itself is adsorbed onto the adsorbent due to competitive adsorption. This state continues until toluene is continuously supplied to the adsorbent and ethyl acetate adsorbed onto the adsorbent is entirely expelled (desorbed) from the adsorbent. The "desorption state I" is complete when ethyl acetate is entirely desorbed from the adsorbent. The desorbed ethyl acetate is sequentially discharged from the adsorption tower (1), is condensed and liquefied in the condenser (15) through the desorbed gas switching valve (17), and then is recovered in the volatile organic compound recovery tank (11).

Upon completion of the "desorption state I", all the substance adsorbed onto the adsorbent is toluene. Thus, the adsorbent regeneration gas supply valve (5) is set in an open state, the desorption gas supply valve (4) is set in a closed state, the desorbed gas switching valve (17) is set in a closed state, the desorbed gas switching valve (18) is set in an open state, and the operating state transitions to the "desorption state II" shown in the operating state (e) in FIG. 3. Water vapor is supplied to the adsorption tower (1) through the adsorbent regeneration gas switching valve (5), the adsorbent is heated by water vapor, and then the adsorbed toluene is desorbed from the adsorbent. The desorbed toluene is mixed with water vapor. The resulting mixture is discharged from the adsorption tower (1), and is condensed and liquefied in the condenser (16) through the desorbed gas switching valve (18). The liquefied toluene is separated from water in the separation tank (13) by gravity separation, the separated toluene is recovered in the volatile organic compound recovery tank (12), and then the separated water is disposed as a wastewater through a drain line (20).

Upon completion of the "desorption state II", the adsorbent regeneration gas supply valve (5) is set in a closed state, and the operating state transitions to the "desorption gas purge state" shown in the operating state (f) in FIG. 3. Water vapor remaining in the adsorption tower (1) is discharged from the adsorption tower (1) by the vacuum pump (14), and then, is condensed and liquefied in the condenser (16) through the desorbed gas switching valve (18). Next, water condensed in the separation tank (13) is separated from toluene by gravity separation, the separated toluene is recovered in the volatile organic compound recovery tank (12), and then the separated water is disposed as a wastewater through the drain line (20). After that, the desorbed gas switching valve (18) is set in a closed state, the untreated gas intake valve (2) and the treated gas exhaust valve (3) are set in an open state, and the operating state returns back to the "adsorption state" shown in the operating state (a) in FIG. 3. The recovery of the volatile organic compound from the untreated gas may be continued by the repetition of the operating states (a) to (e).

Example 3

Next, a description will be given of Example 3 of the present invention with reference to the system structural view shown in FIG. 5.

The volatile organic compound recovery device according to Example 2 enables recovery in the case where one or more volatile organic compounds or two or more volatile organic compounds containing a desorption gas (toluene in the above example) are contained in the untreated gas but does not enable individual separation and recovery of the compounds of different types because the volatile organic compounds other than the desorption gas are collectively recovered in the volatile organic compound recovery tank (11).

Example 3 is intended to solve the problem of Example 2 and relates to a volatile organic compound recovery device with a wide range of application.

More specifically, the volatile organic compound recovery device is configured to include liquefaction recovery units (24) and (25) corresponding to the types of the volatile organic compounds desired for separation and recovery. The liquefaction recovery unit (25) which is additionally provided in the volatile organic compound recovery device of Example 2 shown in FIG. 2 consists of a desorbed gas switching valve (23), a condenser (22), and a volatile organic compound recovery tank (21) which are disposed in parallel with the desorbed gas switching valve (17), the condenser (15), and the volatile organic compound recovery tank (11), respectively, in Example 2 shown in FIG. 2.

Figure 5:
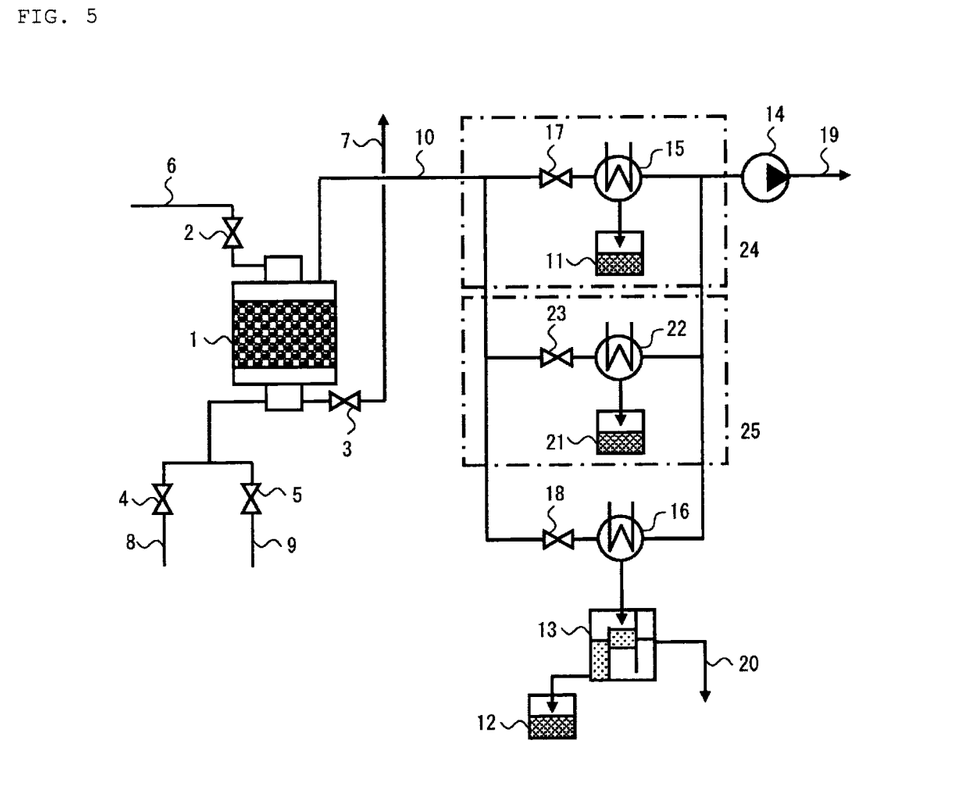
FIG. 5 is a system structural view illustrating a characteristic configuration of a volatile organic compound recovery device according to Example 3 of the present invention.
Figure 6:
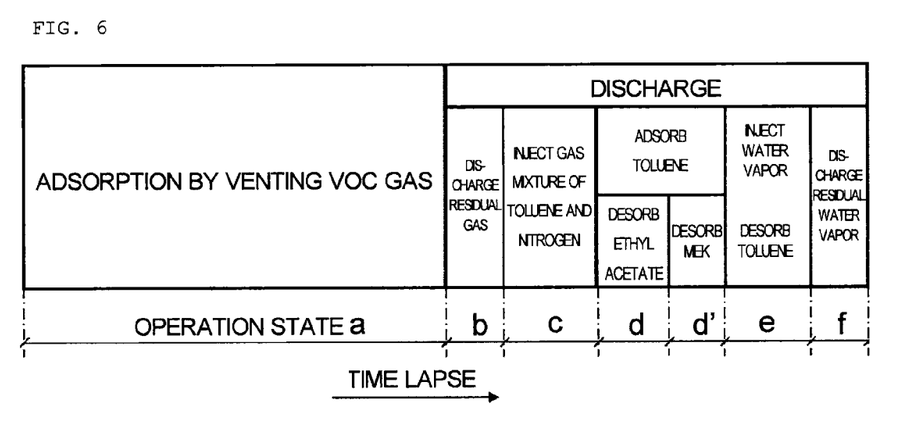
FIG. 6 is a timing chart illustrating the change in the operating state of the volatile organic compound recovery device according to Example 3 of the present invention.

FIG. 6 shows a timing chart illustrating a time-series change in the operating state in FIG. 5. The operations performed in the operating states (a) to (c) in the present embodiment are the same as those in the operating states (a) to (c) in Example 2. In the present embodiment, the volatile organic compound as a desorption gas is toluene as in Example 2 and the volatile organic compounds to be separated and recovered are ethyl acetate and MEK (methyl ethyl ketone). The adsorbability of the volatile organic compounds is toluene>ethyl acetate>MEK in descending order.

Thus, after completion of the operating state (c), toluene which is introduced as a desorption gas into the adsorption tower and has the highest adsorbability desorbs MEK having the lowest adsorbability due to competitive adsorption, and the toluene itself is adsorbed onto the adsorbent. This state is the operating state (d). In this operating state, the desorbed gas switching valve corresponding to the volatile organic collection tank in which the desorbed and discharged MEK is desired to be recovered is set in an open state and other desorbed gas switching valves are set in a closed state. For example, if it is desired to recover MEK in the volatile organic compound recovery tank (11), the desorbed gas switching valve (17) is set in an open state. Here, the open/closed state of valves other than the desorbed gas switching valve is the same as the operating state (d) in Example 2 shown in FIG. 3.

When MEK is entirely desorbed, ethyl acetate having higher adsorbability than that of MEK is then desorbed by the action of competitive adsorption with toluene. This state is the operating state (d'). In this operating state, the desorbed gas switching valve corresponding to the volatile organic collection tank in which the desorbed and discharged ethyl acetate is desired to be recovered is set in an open state and other desorbed gas switching valves are set in a closed state. For example, if it is desired to recover ethyl acetate in the volatile organic compound recovery tank (21), the desorbed gas switching valve (23) is set in an open state. Here, the open/closed state of valves other than the desorbed gas switching valve is the same as the operating state (d) in Example 2 shown in FIG. 3.

Upon completion of the operating state (d'), only toluene as a desorption gas is adsorbed onto the adsorbent, the process sequentially proceeds to the operating states (e) and (f) as in Example 2, and then, the process transitions to the next adsorption step.

While the volatile organic compound recovery device according to Example 3 is configured to separate and recover three types of volatile organic compounds (ethyl acetate, MEK, and toluene), the number of volatile organic compounds to be separated and recovered is not limited to three but three or more volatile organic compounds can also be separated and recovered by increasing the liquefaction recovery units (24) and (25) corresponding to the number of volatile organic compounds to be separated and recovered.

While the adsorption tower is composed of a single tower in the volatile organic compound recovery device in Example 1, 2, and 3, the adsorption tower may also be composed of a plurality of towers, and other embodiments may also be possible so as to successively perform the recovery operation of the volatile organic compounds without interruption by shifting the timing of each operation state in each adsorption tower.

As described above, in the present invention, even if a water-soluble volatile organic compound is contained in the recovered volatile organic compounds, the water-soluble volatile organic compound can be recovered without being dissolved in water. Thus, it is possible to eliminate a need for a distillation device to separate and remove water. Additionally, even if the volatile organic compounds consist of a plurality of types of compounds, the volatile organic compounds can be separated and recovered separately for each type of compound. Thus, it is possible to eliminate a need for a distillation device to separate and recover a plurality of types of volatile organic compounds liquefied and recovered separately for each type of compound. As a result, energy consumption by the distillation device may be eliminated, so that the present invention can render energy saving possible and also render the equipment simple.

The volatile organic compound recovery device according to the present invention is not limited to the configuration of the above embodiments.

REFERENCE NUMERALS

1: adsorption tower
2: untreated gas intake valve
3: treated gas exhaust valve
4: desorption gas supply valve
5: adsorbent regeneration gas supply valve
6: untreated gas supply line
7: treated gas exhaust line
8: desorption gas supply line
9: adsorbent regeneration gas supply line
10: desorption gas line
11, 12, 21: volatile organic compound recovery tank
13: separation tank
14: vacuum pump
15, 16, 22: condenser
17, 18, 23: desorbed gas switching valve
19: desorbed gas exhaust line
20: drain line
24, 25: liquefaction recovery unit

The invention claimed is:

1. A device for recovering a volatile organic compound contained in an untreated gas, the device comprising:
    an adsorption tower containing an adsorbent for adsorbing the volatile organic compound contained in the untreated gas;
    a desorption gas supply means configured to supply a high-adsorbability volatile organic compound, the high-adsorbability volatile organic compound being a volatile organic compound which has higher adsorbability than that of the volatile organic compound adsorbed onto the adsorbent or the high-adsorbability volatile organic compound being a volatile organic compound which has the highest adsorbability among a plurality of types of volatile organic compounds adsorbed onto the adsorbent of the adsorption tower; and a recovery means configured to recover the volatile organic compound desorbed from the adsorbent due to competitive adsorption with the high-adsorbability volatile organic compound.

2. The volatile organic compound recovery device according to claim 1, wherein the desorption gas supply means further comprises a desorption gas mixing means configured to mix the high-adsorbability volatile organic compound with air, an inert gas, or a mixture thereof.

3. The volatile organic compound recovery device according to claim 1, further comprising:

an adsorbent regeneration gas supply means configured to supply a gas for desorbing the high-adsorbability volatile organic compound from the adsorbent of the adsorption tower.

4. The volatile organic compound recovery device according to claim 3, further comprising:

a recovery means configured to recover the high-adsorbability volatile organic compound desorbed from the adsorbent.

5. The volatile organic compound recovery device according to claim 1, comprising:

two or more recovery means configured to recover the volatile organic compound desorbed from the adsorbent due to competitive adsorption with the high-adsorbability volatile organic compound.

6. A method for recovering a volatile organic compound contained in an untreated gas, the method comprising the steps of:

(i) adsorbing the volatile organic compound contained in the untreated gas onto an adsorbent;

(ii) supplying a high-adsorbability volatile organic compound, the high-adsorbability volatile organic compound being a volatile organic compound which has higher adsorbability than that of the volatile organic compound adsorbed onto the adsorbent or the high-adsorbability volatile organic compound being a volatile organic compound which has the highest adsorbability among a plurality of types of volatile organic compounds adsorbed onto the adsorbent of the adsorption tower, and then desorbing the volatile organic compound adsorbed onto the adsorbent in step (i) due to competitive adsorption; and (iii) recovering the desorbed volatile organic compound.

7. The method according to claim 6, further comprising the step of:

mixing the high-adsorbability volatile organic compound with air, an inert gas, or a mixture thereof, in step (ii).

8. The method according to claim 6, further comprising the step of:

(iv) supplying a gas for desorbing the high-adsorbability volatile organic compound to the adsorbent to regenerate the adsorbent.

9. The method according to claim 8, further comprising the step of:

(v) recovering the high-adsorbability volatile organic compound desorbed from the adsorbent in step (iv).

10. The method according to claim 6, wherein the untreated gas comprises two or more volatile organic compounds, and the method comprising the step of:

recovering the desorbed volatile organic compounds in step (iii) separately for each type of compound using a difference in adsorbability onto the adsorbent.

11. The volatile organic compound recovery device according to claim 2, further comprising:

an adsorbent regeneration gas supply means configured to supply a gas for desorbing the high-adsorbability volatile organic compound from the adsorbent of the adsorption tower.

12. The volatile organic compound recovery device according to claim 2, comprising:

two or more recovery means configured to recover the volatile organic compound desorbed from the adsorbent due to competitive adsorption with the high-adsorbability volatile organic compound.

13. The volatile organic compound recovery device according to claim 3, comprising:

two or more recovery means configured to recover the volatile organic compound desorbed from the adsorbent due to competitive adsorption with the high-adsorbability volatile organic compound.

14. The volatile organic compound recovery device according to claim 4, comprising:

two or more recovery means configured to recover the volatile organic compound desorbed from the adsorbent due to competitive adsorption with the high-adsorbability volatile organic compound.

15. The volatile organic compound recovery device according to claim 11, comprising:

two or more recovery means configured to recover the volatile organic compound desorbed from the adsorbent due to competitive adsorption with the high-adsorbability volatile organic compound.

16. The method according to claim 7, further comprising the step of:

(iv) supplying a gas for desorbing the high-adsorbability volatile organic compound to the adsorbent to regenerate the adsorbent.

17. The method according to claim 7, wherein the untreated gas comprises two or more volatile organic compounds, and the method comprising the step of:

recovering the desorbed volatile organic compounds in step (iii) separately for each type of compound using a difference in adsorbability onto the adsorbent.

18. The method according to claim 8, wherein the untreated gas comprises two or more volatile organic compounds, and the method comprising the step of:

recovering the desorbed volatile organic compounds in step (iii) separately for each type of compound using a difference in adsorbability onto the adsorbent.

19. The method according to claim 9, wherein the untreated gas comprises two or more volatile organic compounds, and the method comprising the step of:

recovering the desorbed volatile organic compounds in step (iii) separately for each type of compound using a difference in adsorbability onto the adsorbent.

20. The method according to claim 16, wherein the untreated gas comprises two or more volatile organic compounds, and the method comprising the step of:

recovering the desorbed volatile organic compounds in step (iii) separately for each type of compound using a difference in adsorbability onto the adsorbent.

* * * * *